(12) United States Patent
Petterson

(10) Patent No.: US 8,970,592 B1
(45) Date of Patent: *Mar. 3, 2015

(54) SIMULATING AN ARBITRARY NUMBER OF PARTICLES

(75) Inventor: Frank Losasso Petterson, Redwood City, CA (US)

(73) Assignee: Lucasfilm Entertainment Company LLC, San Francisco, CA (US)

( * ) Notice: Subject to any disclaimer, the term of this patent is extended or adjusted under 35 U.S.C. 154(b) by 708 days.

This patent is subject to a terminal disclaimer.

(21) Appl. No.: 13/089,761

(22) Filed: Apr. 19, 2011

(51) Int. Cl.
*G06T 15/20* (2011.01)

(52) U.S. Cl.
USPC ........... 345/427; 345/419; 345/424; 345/428; 345/473; 345/475; 703/1; 703/2; 703/6; 703/7; 703/9

(58) Field of Classification Search
CPC combination set(s) only.
See application file for complete search history.

(56) References Cited

U.S. PATENT DOCUMENTS

| | | | |
|---|---|---|---|
| 5,325,472 A | 6/1994 | Horiuchi et al. |
| 5,325,480 A | 6/1994 | Rice |
| 5,347,621 A | 9/1994 | Yutaka |
| 5,475,507 A | 12/1995 | Suzuki et al. |
| 5,537,641 A | 7/1996 | da Vitoria Lobo et al. |
| 5,630,718 A | 5/1997 | Montag et al. |
| 5,877,777 A | 3/1999 | Colwell |
| 5,920,492 A | 7/1999 | Montag et al. |
| 5,923,330 A | 7/1999 | Tarlton et al. |
| 5,966,129 A | 10/1999 | Matsukuma et al. |
| 6,030,289 A | 2/2000 | Nomi et al. |
| 6,052,131 A | 4/2000 | Oka |
| 6,100,893 A | 8/2000 | Ensz et al. |
| 6,121,977 A | 9/2000 | Arai et al. |
| 6,154,576 A | 11/2000 | Anderson et al. |
| 6,198,489 B1 | 3/2001 | Salesin et al. |
| 6,266,071 B1 | 7/2001 | Stam et al. |
| 6,405,151 B1 | 6/2002 | Fujii et al. |
| 6,485,369 B2 | 11/2002 | Kondo et al. |
| 6,500,008 B1 | 12/2002 | Ebersole et al. |
| 6,504,569 B1 | 1/2003 | Jasinschi et al. |
| 6,512,999 B1 | 1/2003 | Dimas et al. |
| 6,583,787 B1 | 6/2003 | Pfister et al. |
| 6,664,961 B2 | 12/2003 | Ray et al. |
| 6,680,735 B1 | 1/2004 | Seiler et al. |
| 6,731,278 B2 | 5/2004 | Yokoyama et al. |

(Continued)

OTHER PUBLICATIONS

Roland Fraedrich, Stefan Aur, Rudiger Westermann, "Efficient High-Quality Volume Rendering of SPH Data", Oct. 24, 2010, IEEE, IEEE Transactions on Visualization and Computer Graphics, vol. 16, No. 6, pp. 1533-1540.*

(Continued)

*Primary Examiner* — Ulka Chauhan
*Assistant Examiner* — Robert Bader
(74) *Attorney, Agent, or Firm* — Kilpatrick Townsend & Stockton LLP

(57) ABSTRACT

A system includes a computing device that includes a memory configured to store instructions. The computing device also includes a processor configured to execute the instructions to perform a method that includes obtaining first data corresponding to a first simulation of matter in a space domain. The method also includes performing, using the first data, a second simulation that produces second data representative of particles in the space domain. The method also includes rasterizing the second data representative of the particles as defined by cells of a grid, wherein each cell has a common depth-to-size ratio, and, rendering an image of the particles from the rasterized second data.

27 Claims, 6 Drawing Sheets

(56) References Cited

U.S. PATENT DOCUMENTS

| | | |
|---|---|---|
| 6,828,962 B1 | 12/2004 | McConkie et al. |
| 6,879,324 B1 | 4/2005 | Hoppe |
| 7,090,577 B2 | 8/2006 | Serizawa et al. |
| 7,102,652 B2 | 9/2006 | O'Donnell et al. |
| 7,471,291 B2 | 12/2008 | Kaufman et al. |
| 7,472,046 B2 | 12/2008 | Rasmussen et al. |
| 7,525,542 B2 | 4/2009 | Stevenson et al. |
| 7,539,606 B2 | 5/2009 | Comair et al. |
| 7,647,216 B2 | 1/2010 | Bermejo Alvarez et al. |
| 7,706,636 B2 | 4/2010 | Higashino et al. |
| 7,747,420 B1 | 6/2010 | Rasmussen et al. |
| 7,876,971 B2 | 1/2011 | Gardella et al. |
| 7,983,477 B2 | 7/2011 | Holliman |
| RE42,638 E | 8/2011 | Ray et al. |
| 8,179,424 B2 | 5/2012 | Moller |
| 8,218,211 B2 | 7/2012 | Kroll et al. |
| 8,224,107 B2 | 7/2012 | Gardella et al. |
| 8,289,327 B1 | 10/2012 | Horvath |
| 8,314,789 B2 | 11/2012 | Fitzmaurice et al. |
| 8,335,675 B1 | 12/2012 | DiVerdi et al. |
| 8,401,225 B2 | 3/2013 | Newcombe et al. |
| 8,587,583 B2 | 11/2013 | Newcombe et al. |
| 8,725,476 B1 | 5/2014 | Petterson |
| 2001/0040586 A1 | 11/2001 | Yokoyama et al. |
| 2002/0050988 A1 | 5/2002 | Petrov et al. |
| 2002/0060682 A1 | 5/2002 | Kohira et al. |
| 2002/0095276 A1 | 7/2002 | Rong et al. |
| 2002/0113787 A1 | 8/2002 | Ray et al. |
| 2002/0149599 A1 | 10/2002 | Dwyer et al. |
| 2002/0149626 A1 | 10/2002 | Ozcelik et al. |
| 2002/0169013 A1 | 11/2002 | Serizawa et al. |
| 2003/0001843 A1 | 1/2003 | Suzuki et al. |
| 2003/0011596 A1 | 1/2003 | Zhang et al. |
| 2003/0017438 A1 | 1/2003 | Ebersole et al. |
| 2003/0035917 A1 | 2/2003 | Hyman |
| 2003/0038800 A1 | 2/2003 | Kawahara |
| 2003/0195735 A1 | 10/2003 | Rosedale et al. |
| 2004/0227992 A1 | 11/2004 | Putilin et al. |
| 2004/0257375 A1 | 12/2004 | Cowperthwaite |
| 2005/0116949 A1 | 6/2005 | Hoppe |
| 2005/0213820 A1 | 9/2005 | Liu et al. |
| 2005/0240384 A1 | 10/2005 | Houston et al. |
| 2005/0253854 A1 | 11/2005 | Lischinski et al. |
| 2007/0239414 A1 | 10/2007 | Song et al. |
| 2009/0070079 A1 | 3/2009 | Harada |
| 2012/0162204 A1 | 6/2012 | Vesely et al. |
| 2012/0236001 A1 | 9/2012 | Mejdrich et al. |
| 2013/0112407 A1 | 5/2013 | Cheng et al. |

OTHER PUBLICATIONS

Matthias Muller, David Charypar, Markus Gross, "Particle-Based Fluid Simulation for Interactive Applications", Jul. 2003, ACM/Eurographics, Proceedings of the ACM SIGGRAPH/Eurographics Symposium on Computer Animation, pp. 154-159.*
Kyle Hegeman, Nathan A. Carr, Gavin S. P. Miller, "Particle-Based Fluid Simulation on the GPU", 2006, Springer-Verlag, Computational Science—ICCS 2006, Lecture Notes in Computer Science, vol. 3994, pp. 228-235.*
Yanci Zhang, Barbara Solenthaler, Renato Pajarola, "Adaptive Sampling and Rendering of Fluids on the GPU", 2008, Eurographics Association, Proceedings of the Fifth Eurographics/IEEE VGTC conference on Point-Based Graphics, pp. 137-146.*
Warrant Hunt, William R. Mark, "Ray-Specialized Acceleration Structures for Ray Tracing", Aug. 10, 2008, IEEE, IEEE/EG Symposium on Interactive Ray Tracing 2008, pp. 3-10.*
Ingo Wald, Thiago Ize, Andrew Kensler, Aaron Knoll, Steven G. Parker, "Ray Tracing Animated Scenes using Coherent Grid Traversal", 2006, ACM, ACM SIGGRAPH 2006 Papers, pp. 485-493.*
Frank Losasso, Ronald Fedkiw, Stanley Osher, "Spatially adaptive techniques for level set methods and incompressible flow", Dec. 2006, Elsevier, Computers & Fluids, vol. 35, Issue 10, pp. 995-1010.*

Chentanez, et al. "Liquid Simulation on Lattice-Based Tetrahedral Meshes" ACM Siggraph Symposium on Computer Animation, Aug. 2007, 10 pages.
Kim, et al. "Wavelet Turbulence for Fluid Simulation", Proceedings of ACM SIGGRAPH 2008, vol. 27, Issue 3, Aug. 2008, 6 pages.
Losasso, et al. "Simulating Water and Smoke with an Octree Data Structure", Proceedings of ACM SIGGRAPH 2004, vol. 23, Issue 3, Aug. 2004, 6 pages.
Nikitin, et al. "Numerical Simulations of Free Surface Flows on Adaptive Cartesian Grids with the Level Set Function Method" 2010 , downloaded from the Internet at: www.mathcs.emory.edu/~molshan/ftp/pub/FS_VP.pdf on Jul. 21, 2011, 19 pages.
Selle, et al. "A Vortex Particle Method for Smoke, Water and Explosions", ACM SIGGRAPH 2005, vol. 24, Issue 3, Jul. 2005, 5 pages.
Barran, Brian Arthur (May 2006) *View Dependent Fluid Dynamics* (Master's thesis). Texas A&M University. 50 pages. Retrieved from http://hdl.handle.net/1969.1/3827.
Bongart, R. (2007) *Efficient Simulation of Fluid Dynamics in a 3D Game Engine* (Master's thesis). Royal Institute of Technology. 86 pages.
Bridson et al., "Fluid Simulation, SIGGRAPH 2007 Course Notes," ACM, Aug. 10, 2007, 93 pages.
Dommermuth et al., "The numerical simulation of ship waves using Cartesian grid methods with adaptive mesh refinement," *25th Symposium on Naval Hydrodynamics*, Aug. 8-13, 2004, 13 pages. St. John's, Newfoundland and Labrador, Canada.
Foster et al., "Controlling Fluid Animation," , Center for Human Modeling and Simulation, University of Pennsylvania, Philadelphia, PA, 2001, 11 pages.
Guthe et al., "Real-Time Out-of-Core Rendering," International Journal of Image and Graphics, Institute of Computer Science II, Bonn University, Germany, 2004, 18 pages.
Horvath et al., "Directable, High-Resolution Simulation of Fire on the GPU," ACM Trans. Graph. 28, 3, Article 41 (Aug. 2009), 8 pages.
Johanson et al. (Mar. 2004) *Real-time water rendering, Introducing the projected grid concept* (Master's thesis). Lund University, 42 pages.
Keiser, R. (2006) *Meshless Lagrangian Methods for Physics-Based Animations of Solids and Fluids* (Dissertation). ETH Zurich, Switzerland, 195 pages.
Lee et al., "A Frustum-Based Ocean Rendering Algorithm," Agent Computing and Multi-Agent Systems, Lecture Notes in Computer Science, vol. 4088, 2006, pp. 584-589.
Tatarchuk, N., "The Importance of Being Noisy: Fast, High Quality Noise," 3D Application Research Group, AMD Graphics Products Group, 2007, 85 pages.
Velikovich, L., "Adapting the Lattice-Boltzmann Model for Efficient Airflow Modeling inside the View Frustum," (Independent Study Project), 2003, 11 pages.
Woo, Alan (Apr. 2006) *Realistic Smoke Simulation Using a Frustum Aligned Grid* (Master's thesis). The University of British Columbia, 47 pages.
Yu et al., "Scalable real-time animation of rivers," EUROGRAPHICS, Blackwell Publishing 2009, vol. 28, No. 2, 10 pages , Oxford UK and Malden, MA, USA.
Zhao et al., "Flow Simulation with Locally-Refine LBM," Association for Computing Machinery, Inc., Apr. 30-May 2, 2007, 8 pages, Seattle, WA.
Barran, Brian Arthur (May 2006) *View Dependent Fluid Dynamics* (Master's thesis). Texas A&M University. 50 page. Retrieved from http://hdl.handle.net/1969.1/3827.
Foster et al., "Controlling Fluid Animation,", Center for Human Modeling and Simulation, University of Pennsylvania, Philadelphia, PA, 2001, 11 pages.
Horvath et al,. "Directable, High-Resolution Simulation of Fire on the GPU," ACM Trans. Graph. 28, 3, Article 41 (Aug. 2009), 8 pages.
Keiser, R. (2006) *Meshless Lagrangian Methods for Physics-Based Animations of Solids and Fluids* (Dissertation), ETH Zurich, Switzerland, 195 pages.

(56) References Cited

OTHER PUBLICATIONS

Lee et al., "An Efficient Algorithm for Rendering Large Bodies of Water." ICEC 2006, LNCS 4161, pp. 302-305, 2006.
Tatarchuk, N , "The Importance of Being Noisy: Fast, High Quality Noise," 3D Application Research Group, AMD Graphics Products Group, 2007, 85 pages.
Woo, Alan (Apr. 2006) *Realistic Smoke Simulation Using a Frustum Aligned Grid* (Masters thesis). The University of British Columbia, 47 pages.
Yu et al., "Scalable real-time animation of rivers," EUROGRAPHICS, Blackwell Publishing 2009, vol. 28, No. 2, 10 pages , Oxford UK and Malden, MA USA.

\* cited by examiner

SIMULATING AN ARBITRARY NUMBER OF PARTICLES

TECHNICAL FIELD

This document relates to a system and methodology for simulating particles.

BACKGROUND

Simulation is an area of computer graphics that places high demands on the ability to generate lifelike images, sometimes as close to an actual photograph as possible, and also to be able to do so as quickly as possible or using the least amount of system resources. A particular challenge in simulation is to generate a plausible appearance—and in animated sequences, behavior—of fluid materials such as air that contains particles (e.g., dust particles), taking into account practical limits for how much system resources can be used and how rapidly the simulation should be generated.

SUMMARY

The systems and techniques described here relate to techniques for simulating and rendering an arbitrary number of particles in a computationally efficient manner while conserving storage space.

In one aspect, a computer-implemented method includes obtaining first data corresponding to a first simulation of matter in a space domain. The method also includes performing, using the first data, a second simulation that produces second data representative of particles in the space domain. The method also includes rasterizing the second data representative of the particles as defined by cells of a grid, wherein each cell has a common depth-to-size ratio, and, rendering an image of the particles from the rasterized second data.

Implementations may include any or all of the following features. The method may also include storing the rasterized second data in a retrievable form. Performing the second simulation may be distributed among multiple computing devices. Rendering the image may include ray tracing the cells of the grid. The first simulation may represent various type of information such as a vector field. The matter may represent fluid or other types of matter. The grid may be a perspective of frustum space or other type of space. Rasterizing the second data may include rasterizing cells that represent particles of the second data. Rasterizing the second data may include not rasterizing cells absent particles of the second data.

In another aspect, a system includes a computing device that includes a memory configured to store instructions. The computing device also includes a processor configured to execute the instructions to perform a method that includes obtaining first data corresponding to a first simulation of matter in a space domain. The method also includes performing, using the first data, a second simulation that produces second data representative of particles in the space domain. The method also includes rasterizing the second data representative of the particles as defined by cells of a grid, wherein each cell has a common depth-to-size ratio, and, rendering an image of the particles from the rasterized second data.

Implementations may include any or all of the following features. The processor may be configured to store the rasterized second data in a retrievable form. Performing the second simulation may be distributed among multiple computing devices. Rendering the image may include ray tracing the cells of the grid. The first simulation may represent various type of information such as a vector field. The matter may represent fluid or other types of matter. The grid may be a perspective of frustum space or other type of space. Rasterizing the second data may include rasterizing cells that represent particles of the second data. Rasterizing the second data may include not rasterizing cells absent particles of the second data.

In another aspect, a computer program product tangibly embodied in an information carrier and comprising instructions that when executed by a processor perform a method that includes obtaining first data corresponding to a first simulation of matter in a space domain. The method also includes performing, using the first data, a second simulation that produces second data representative of particles in the space domain. The method also includes rasterizing the second data representative of the particles as defined by cells of a grid, wherein each cell has a common depth-to-size ratio, and, rendering an image of the particles from the rasterized second data.

Implementations may include any or all of the following features. Further instructions may be included that when executed by the processor perform a method that includes storing the rasterized second data in a retrievable form. Performing the second simulation may be distributed among multiple computing devices. Rendering the image may include ray tracing the cells of the grid. The first simulation may represent various type of information such as a vector field. The matter may represent fluid or other types of matter. The grid may be a perspective of frustum space or other type of space. Rasterizing the second data may include rasterizing cells that represent particles of the second data. Rasterizing the second data may include not rasterizing cells absent particles of the second data.

Details of one or more implementations are set forth in the accompanying drawings and the description below. Other features, aspects and advantages will be apparent from the description and drawings, and from the claims.

DETAILED DESCRIPTION

Figure 1:
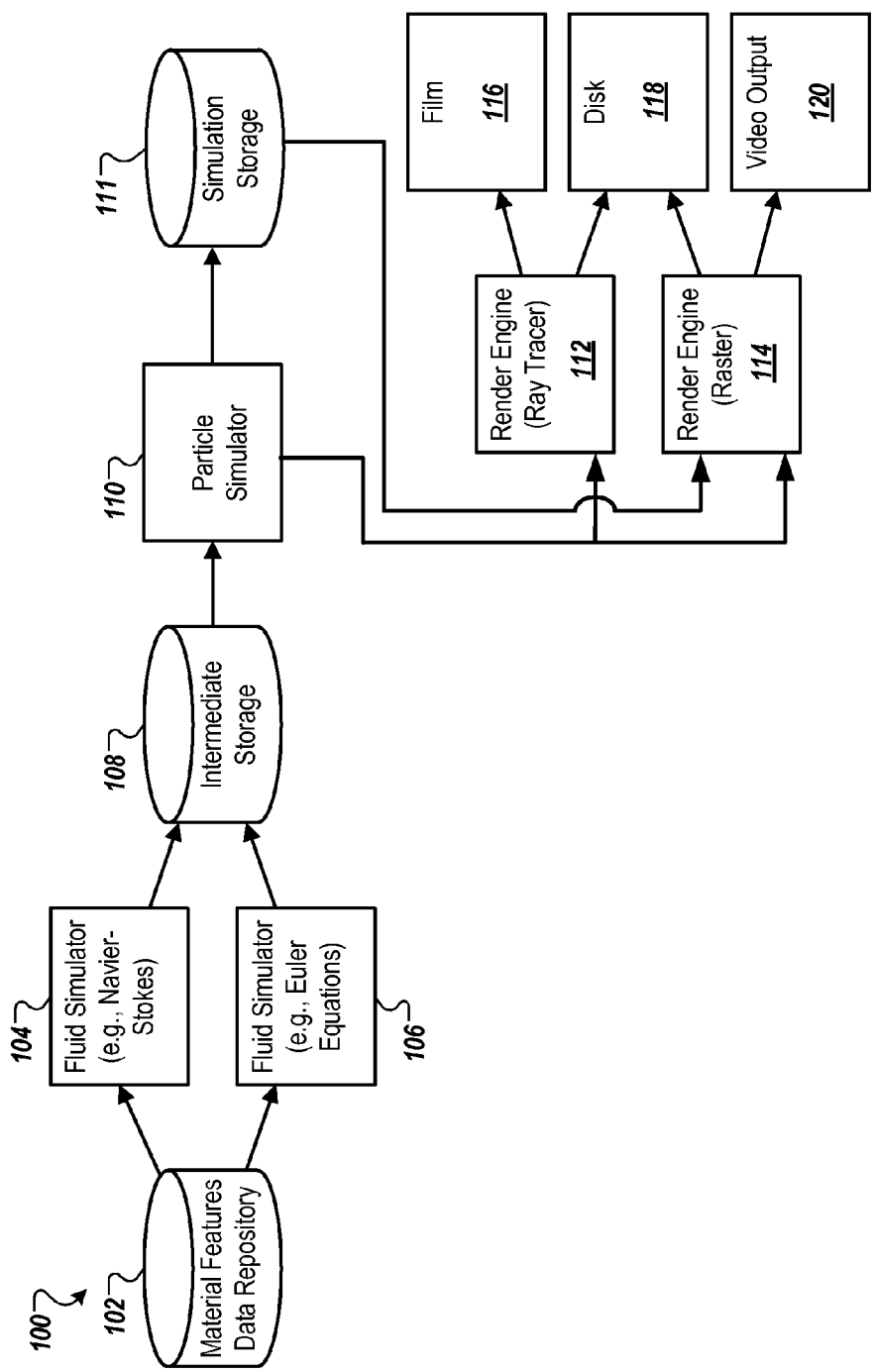
FIG. 1 is a block diagram of an example computer system for generating and rendering fluid simulations.

FIG. 1 is a block diagram of an example computer system 100 that can generate and render fluid models that include an arbitrary number of particles. In some implementations, the computer system 100 generates a three dimensional model of a fluid, applies high resolution detail to particles associated with the model, and renders the model into a two dimensional image. For example, such high-resolution detail can be selectively distributed using a perspective grid in the model. The computer system 100 can be used to make frames of a video, such as for a cinematic movie or live videogame output, to name just a few examples.

A material features data repository 102 can store data defining fluid behavior for use in one or more fluid simulations. In some examples, the data in the materials features data repository 102 includes vector and scalar features used to define parameters of a fluid that can affect the visual appearance of the fluid. For example, a smoke fluid can be based on vector values for airflow and scalar values for temperature and density.

A fluid simulator 104 and/or 106 can receive data defining fluid behavior. In some implementations, the fluid simulator 104 and/or 106 can generate a three dimensional model of the fluid, the model including at least one vector field and at least one scalar field. In some examples, the fluid simulators 104 and/or 106 can receive additional data, such as a three dimensional model defining an environment in which the fluid is modeled. In some examples, the fluid simulator 104 can be configured to solve fluid motion using the same or different calculations as the fluid simulator 106. For example, the fluid simulator 104 can use the Navier-Stokes method of solving globally coupled fluid motion, and the fluid simulator 106 can use the incompressible Euler equations method of solving globally coupled fluid motion. Other simulation methods can be used. The system 100 can include one or more simulators, e.g., the simulator 104 and/or 106.

In some implementations, a three dimensional model created by the fluid simulator 104 and/or 106 can be stored in an intermediate storage 108. The three dimensional model can be defined with reference to any of multiple space domains capable of representing at least three dimensions, for example a Cartesian world space domain. In some examples, the fluid model can be accessed to solve an engineering problem or used in motion picture rough cuts. The intermediate storage 108 can be based on one or more computer readable media.

Once created, the fluid model can be used by one or more simulators to produce simulations with a higher level of detail. For example, the fluid model can be used by a noise simulator to create a high frequency fluid model. The noise simulator can increase the detail level of the original fluid model by applying noise to the vector and/or scalar fields of the fluid model. For example, the fluid model can be treated as non-globally-coupled. In some examples, the noise applied to the fluid model can be of a higher frequency than the fluid model. In other implementations, another simulator can be used to generate detail data at a higher resolution than the earlier simulation. In this particular arrangement, a particle simulator 110 uses vector field of the fluid model (e.g., a velocity vector field) to advect particles (e.g., with small scale turbulence) through the fluid simulation. For illustrative purposes, the particle simulator is represented by a single simulator. However, operations of the simulator may be distributed, for example, among a number of computing devices (e.g., computer systems). By balancing the particle simulation load, more simulations may be efficiently computed. As such, given appropriate computation resources, an arbitrary number of particles may be simulated by the system 100. Additionally, by storing data associated with presenting the particles, rather than data that represents each individual particle, considerable storage space can be conserved. In this particular arrangement, data associated with presenting the particles is stored in a storage device 111 (labeled simulation storage). Additional information associated with the fluid model may also be stored in the simulation storage 111.

The fluid model (e.g., particle simulation) can be rendered by a render engine 112 and/or 114. The render engines 112 and/or 114 can perform volume rendering functions to create a two dimensional image from the three dimensional fluid model. In some examples, the render engine 112 can perform ray tracing volume rendering upon retrieving data from the simulation storage 111. Data for ray tracing may also be directly provided to the render engine 112 from the particle simulator 110. In a similar manner, the render engine 114 can perform raster volume rendering from data provided received from the simulation storage 111 or directly from the particle simulator 110. In general the render engine 112 and/or 114 can store two dimensional images to a film 116, a disk 118 (or other type of storage device or memory), live video output 120, and/or other output media. The system 100 can include one or more render engines, e.g., the render engine 112 and/or 114.

The fluid model can be incremented by the fluid simulator 104 and/or 106, such as to represent points in time. In some implementations, such incrementing can be performed when generating individual video frames. For example, a model for a video to be shown at sixty frames per second can by incremented by one sixtieth of a second.

Figure 2:
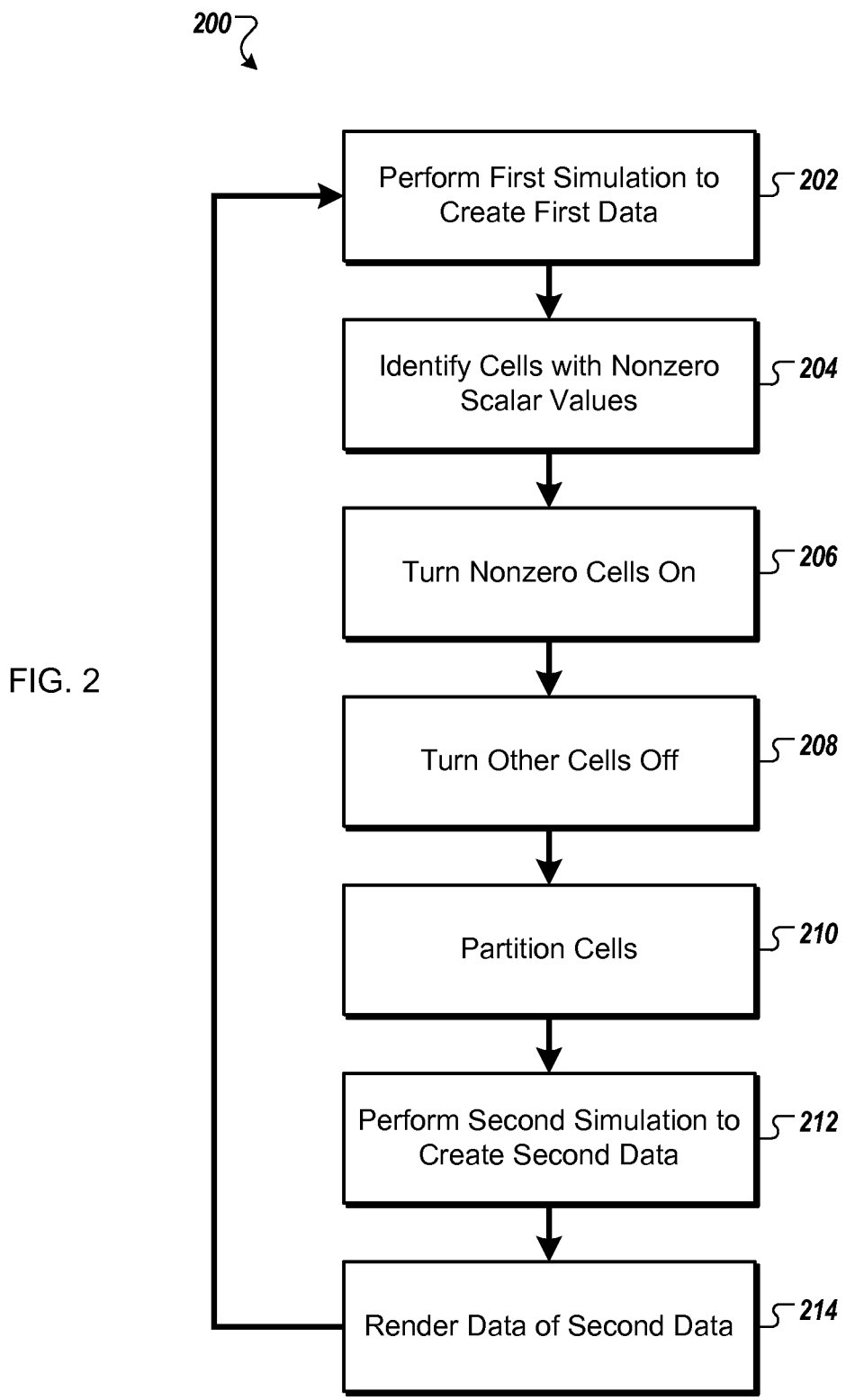
FIG. 2 is a flowchart of an example process for rendering a fluid simulation.

FIG. 2 is a flowchart of an example process 200 for generating and rendering a fluid model. In some implementations, the process 200 can be used to generate a first fluid model, identify areas of the model to be displayed, generate high frequency details based on the first fluid model to create a second fluid model, and display the second fluid model.

A first simulation can be performed to create first data (202). In some implementations, a globally coupled fluid model can be solved to create scalar and vector fields that represent physical properties of the model, such as temperature, color, density, velocity, and state of matter. For example, the fluid simulator 104 and/or 106 can generate a relatively low-resolution simulation of a fluid, such as the expansion of gas in a simulated explosion.

The environment containing the model can be partitioned into a perspective grid, for example a frustum-shaped three dimensional grid. Some of the cells can be identified as containing nonzero scalar values (204), and these cells can be assigned a value such as 'on' (206). Other cells can be assigned a value 'off' (208). In some implementations, either 'on' or 'off' can be a default value that is initially applied to all cells, and only the applicable one of steps 206 and 208 need then be performed.

Cells containing portions of the model, such as those assigned a value 'on,' can be partitioned (210) into subcells. In some implementations, the partitioning is performed automatically in all 'on' cells based on their status.

A second simulation can be performed to create second data (212). In some implementations, for each subcell, pseudo-random numbers within a predefined range can be added to the values of the scalar and/or vector fields to represent turbulence or noise. For example, the noise simulator 110 can create the second data.

The second data can be rendered (214) into a two dimensional image. In some examples, a color can be determined for each point in the scalar and/or vector fields. For example, in a model of smoke, the value at a point in a scalar field representing density and a scalar field representing temperature can be collected. The two scalar values can be used as the input to a function that returns a color for each point, such as a red, green, blue color (RGB color) with an alpha level (e.g., transparency). The color values can be used with volume rendering techniques to create a two dimensional image.

One or more of the operations of the method 200 can be repeated, such as for each frame of a video. Although a particular number, order, and type of operations are shown, it will be understood that other numbers, orders, and types of operation are possible. For example, the operations 204-210 can represent optional optimization operations intended to prevent calculation for volume not containing the model.

Figure 3A:
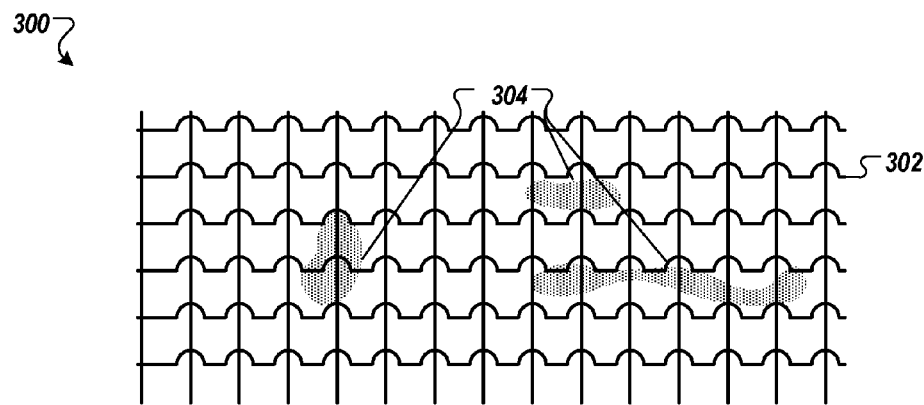
FIGS. 3A and B are block diagrams of an example fluid simulation.

FIGS. 3A and B are block diagrams of an example fluid model. The fluid model can be used to determine the color and shape of a fluid in a virtual environment for rendering into a two dimensional shape. In some examples, the fluid model can generally include data of a relatively low frequency and, near a viewport, the fluid model can include data of a relatively high frequency, such as to provide visual detail.

In a first simulation, data 300, which can represent one or more fluids at a particular time, can be defined with regard to any space domain, for example a three dimensional Cartesian coordinate space, or can be defined using any other indexing method. A coordinate grid 302 here illustrates two of the dimensions of the Cartesian coordinate system, with the third dimension not visible. One or more simulation fluids 304 can be represented in the data 300 using at least a vector field and/or a scalar field. The vector and/or scalar fields can be used to solve for the fluids 304 at an arbitrary point in time. For example, if the state of the vector and/or scalar fields is known at a time $T_0$, the state of the vector and/or scalar fields at another time $T_1$ can be determined. The shape of one or more of the fluids 304 can then be different at the times $T_o$ and $T_1$.

In some examples, a vector field can represent a velocity of the fluids 304 and a scalar field can represent a physical property of the fluid, such as temperature, density, color, and/or state of matter. In some examples, the fluids 304 can be considered to be globally coupled. In some examples, the data 300 can be generated at a first resolution and can be used to represent fluid flow at the first resolution. Thus, the data 300 can be at a low resolution and represent low resolution fluid flow.

In a second simulation, data 350, which can represent fluids at a particular time, can be organized using a frustum coordinate space, or using another indexing and/or perspective indexing method. A coordinate grid 352 is shown to illustrate two of the three dimensions of the frustum coordinate space. Simulation fluids 354 are here represented in the data 350 by at least a vector field and/or a scalar field. In some examples, the vector field can represent the velocity of the fluids 354 and a scalar field can represent a physical property, such as temperature, density, color, and/or state of matter. The vector and/or scalar fields can be modified to add detail to the fluids 354, such as to improve the visual appearance of the fluids 354 when rendered. In some examples, the fluids 304 are used to create the fluids 354 at the same time state.

The frustum space in the data 350 can represent the area visible to a virtual camera 356 used, for example, in rendering the data 350 into a two dimensional image. In some examples, the frustum space is perspective space. The frustum space can be configured to place more high-resolution detail near the camera, where it matters more to a viewer. For example, the ratio of height or width to depth of each cell in the frustum space can be constant. Here, a height of each cell as seen by the camera is defined using an x-axis, and a depth of each cell as seen by the camera is defined using a z-axis. The width of each cell as seen by the camera is not visible in FIG. 3B, but can be defined using a y-axis in analogy with the x-axis. Here, for a cell 358 near the virtual camera 356 and a cell 360 farther from the virtual camera, the height to depth ratio of the cell 358 (dx1:dz1) and that of the cell 360 (dx2:dz2) can be equal (dx1:dz1=dx2:dz2). In such examples, the cells near the camera have the same height to depth ratio as all other cells, and have a smaller volume than the cells farther away from the camera. In the frustum space, high level simulation data for a cell near the camera is applied to a smaller region of the model than other high level simulation data for a cell far from the camera.

In some examples, the cells of the coordinate grid 352 can be subdivided or partitioned. For example, cells not containing the fluids 354 can be turned 'off' indicating that the empty cells can be ignored for the second simulation. Cells containing the fluids 354 can be turned 'on' and subdivided into subcells for use in the second simulation.

A random value (e.g., noise or turbulence) can be applied to the vector and/or scalar fields of the fluids 354 in one or more subcells. For example, such data can be applied to each subcell, or to each cell that is turned 'on,' or to each cell of the coordinate grid 352. In some implementations, the fluids 354 can be treated as non-globally-coupled, such that noise applied to one point of the fluids 354 does not necessarily affect the data at any remote points in the fluids 354. In some examples, each cell can have the same amount of noise data applied and, in some examples such as where each cell's height to width ratio is constant, noise data per volume density is greater closer to the camera than farther. In some examples, the data 350 can be at a higher resolution and represent higher resolution fluid flow than the resolution of the data 300.

Similar to applying random values for fluid simulations, cells and subcells of a grid (e.g., a frustum-shaped three dimensional grid) may be used for other type of simulations. For example, such a grid can be used for simulating particles (e.g., particle movement) based upon a fluid simulation (e.g., provided by fluid simulator 104 or 106). Based upon the seemingly independent nature of particles (e.g., independent movement of dust particles) and the provided fluid simulation, particle simulations may be performed such that limitations on the number of particles may be removed. As such, an arbitrary number of particles may be simulated. Further, by computing the particle simulations in a distributed manner, limitations due to computational resources are reduced. For example, by distributing computations over a number of computer systems, computation power (e.g. central processing unit (CPU) power), memory and other types of resources can be conserved. As such, by executing operations in parallel, for example, by executing particle simulators (e.g., such as particle simulator 110) on multiple computer systems, simulations may be efficiently produced. Data storage efficiency may also be improved based upon particle simulation operations. For example, rather than storing data representative of each simulated particle (e.g., on the storage device 111), the particle data may be processed prior to storage. In one arrangement, the particle data may be rasterized and stored in a rasterized form. For example, particle data may be rasterized onto a grid such as a frustum-shaped three dimensional grid (e.g., coordinate grid 352) and stored (e.g., in the storage device 111). Storing such rasterized data typically calls for considerably less memory compared to the storage space needed to store information associated with each individual (simulated) particle. Once retrieved, the rasterized data may be processed (e.g., ray-traced) to render a two dimensional image (e.g., a frame for a particular time). Rendring imagery from rasterized data is generally more computationally efficient than rendering one or more images by ray-tracing data that represents individual particles in a volume. As such, computational efficiency may be improved by distributing particle simulation operations, storing rasterized particle data and producing imagery by rendering the rasterized particle data.

Figure 4:
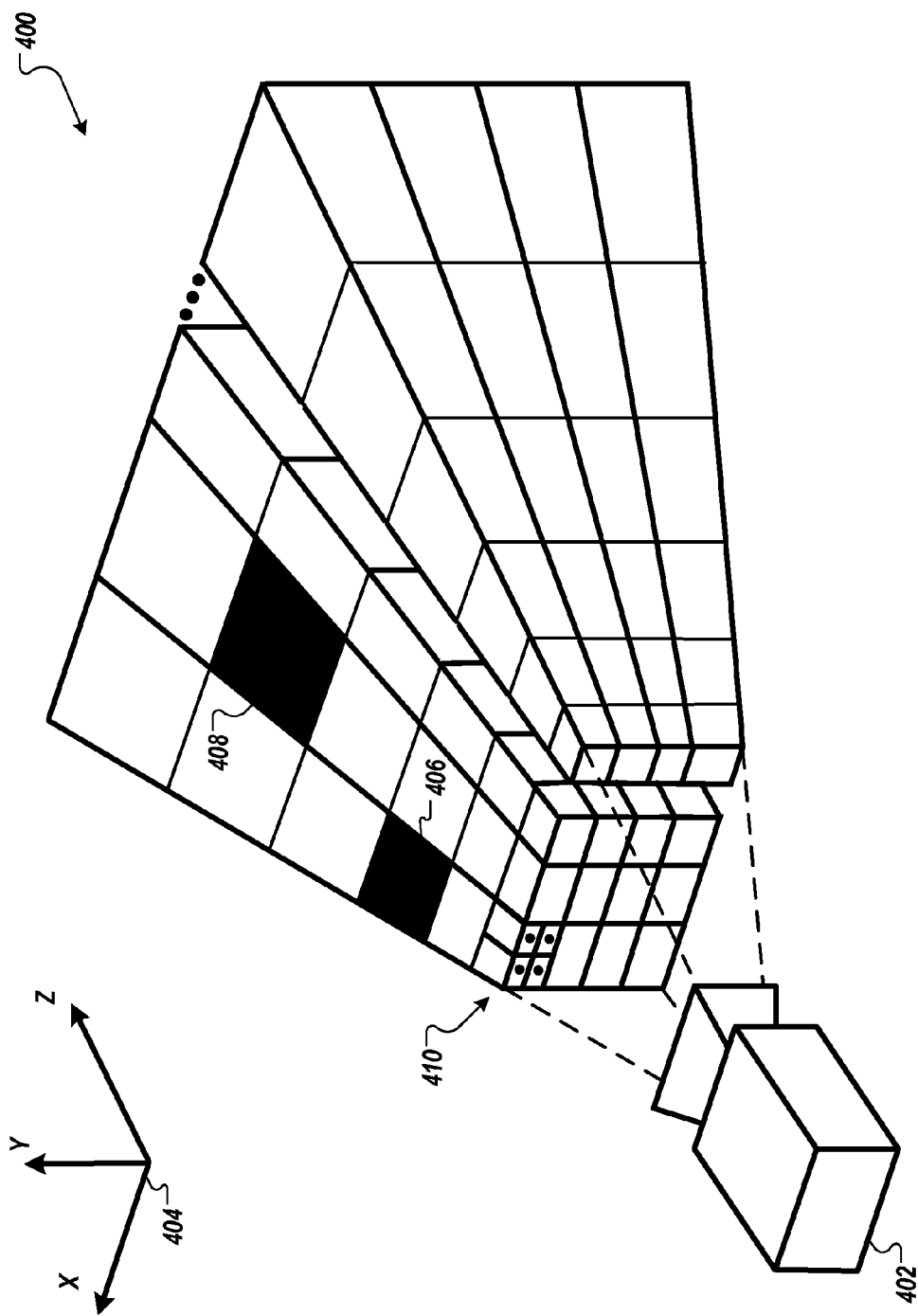
FIG. 4 illustrates cells for simulating particles.

Referring to FIG. 4, a three-dimensional representation of a frustum-shaped grid 400 is shown that allows particle simulations to be efficiently produced, stored and rendered. For example, a particle simulator (e.g., the particle simulator 110 of FIG. 1) may simulate particles for one or more vector fields (e.g., computed by fluid simulator 104, 106, etc.). In some arrangements, the particles may be considered passive and driven (e.g., their motion) by the computed flow field. Unlike the vector fields of the first simulation, the particles can be considered uncoupled and generally unaffected by other particles. For example, each particle may represent a dust particle that is being passively advected through velocity fields. Operating relatively independent, the particle simulations may be disturbed among a number of computer systems (or other types of computing devices) or utilize other parallel processing techniques. For example, one hundred computers could be used such that each computer system simulates 10 million particles (e.g., dust particles in a velocity field). In aggregate, such an arrangement thereby computes a simulation for 1 billion particles. Using a single computer system, executing a billion particle simulations may be extremely inefficient and may tax the computational resources of the computer system to the point of overload. However, by distributing the workload, each of the one hundred computers may efficiently execute its assigned computations with relative ease. Once computed, data representing the simulated particles may be stored for later retrieval for further processing, e.g., rendering as two-dimensional images. However, storing such data may call for significant storage space, especially if the particle simulation data provided from multiple computers (e.g., all one hundred computer systems) is to be stored in a single repository.

Figure 3B:
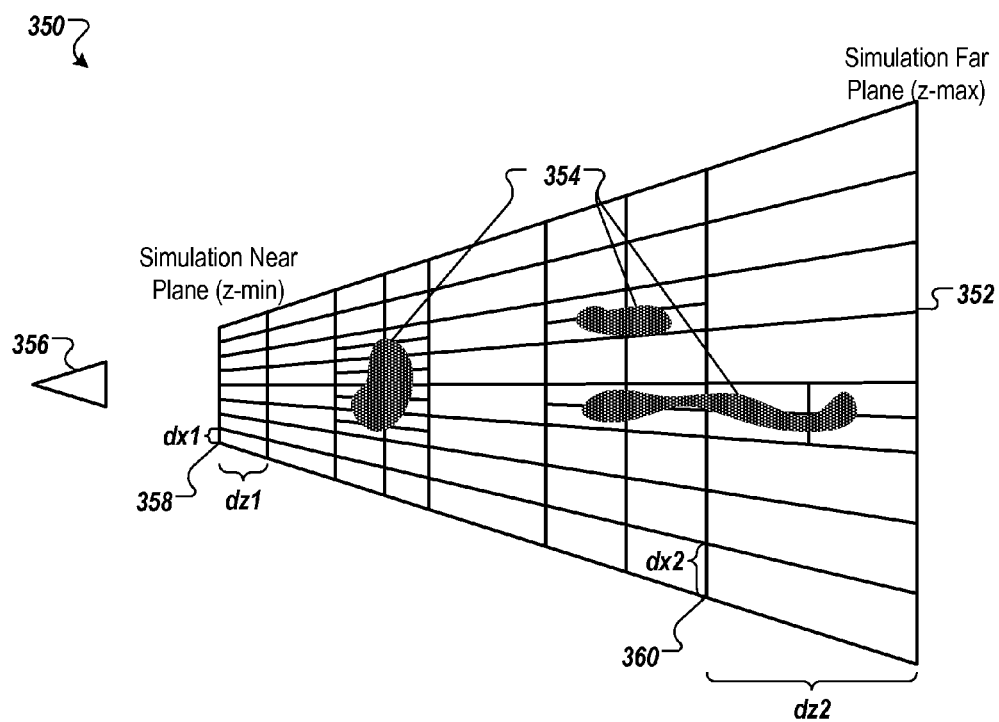

One or more techniques may be implemented to reduce the amount of space needed for storing the particle simulation data (e.g., computed by one hundred computer systems). For example, the particle data can be represented in a spatial geometry that provides a perspective space such that more high-resolution particle detail is located closer to a viewer (e.g., particle data represented in a frustum space as illustrated in FIG. 3B). To provide this perspective, the ratio of height or width to depth of each cell in the frustum space can be constant (as shown in FIG. 3B). Accordingly, a cell near a virtual camera 402 and a cell (farther from the virtual camera) have equivalent height (and width) to depth ratios. As such, the cells near the camera 404 have the same height (and width) to depth ratio as all other cells, and have a smaller volume than the cells farther away from the camera. So more particle detail is provided from cells near the virtual camera 402.

Similar to the frustum space in FIG. 3B, the grid 400 may include cells and subcells for representing simulated particle information. Further, along with being used to represent such information, the grid 400 may also be used for storing the particle information. By determining that a cell or subcell is absent particle information, the cell or subcell may be deactivated (e.g., turned "off") and passed over when storing information represented in the grid 400. Correspondingly, cells or subcells that contain particle information (e.g., even information for a single particle) may be considered active (e.g., turned "on") and provide data for storage. Additionally, based on how the simulated particle information is represented in the grid, less space may be needed for storage. For example, rather than directly populating the grid with data that represents each individual simulated particle, each cell (or subcell) may represent a single quantity that is calculated from the particles present in the corresponding cell or subcell. Along with reducing storage needs, the stored information may be used for efficiently executing other operations. For example, the single quantity associated with each cell may be used for rending a two dimensional image from the information stored in the grid. In one arrangement, ray tracing may be used for image generation, however, one or more other techniques may be utilized. As such, a frustum-shaped three dimensional grid (or a grid of similar geometry) may reduce storage needs for simulated particle data along with improving image rendering efficiency.

In this particular example, the grid 400 represents the area visible to the virtual camera 404, for example, to render a two dimensional image of data represented in the grid. Dependent upon the particle simulation being executed, the grid 400 may have various resolutions. For example, the number of cells along the x-axis and y-axis (as defined by a coordinate key 408) may correspond to pixels of a two dimensional image (to be produced). In one arrangement, a grid may include 2048 cells along the x-axis, 1024 cells along the y-axis and 1600 cells along the z-axis. Such numbers of cells along the three axes may provide reasonable resolution and also assure that particle information is not substantially lost when converting individual particle information into the cell-based resolution provided by the grid. Along with subdividing the cells into subcells, the cells of a grid may also be grouped together, for example, to form blocks. In one example, each block may include eight cells, as such, the grid of 2048 cells by 1024 cells by 1600 cells can be defined as having 256 blocks (along the x-axis) by 128 blocks (along the y-axis) by 200 blocks (along the z-axis). Also, similar to individually activating (turning "on") or deactivating (turning "off") individual cells and subcells, blocks may also be activated or deactivated based upon the particles that resides in each block. In this particular example, two blocks 406, 408 are darkened out to represent that both are inactive. As such, when storing the information contained in the grid 400, no information is stored in regards to these two blocks, thereby reducing the amount of space needed to store the particle simulation information represented in the grid 400. In this example, while just two blocks 404, 406 are illustrated as lacking information, for typical particle simulations, many blocks may be found to absent particles. For example, dust particles simulated in a velocity field (e.g., that represents swirling air) may be found in only ten percent of the blocks in a grid. As such, a considerable amount of storage space may be conserved for such an application.

Various techniques may be used to accurately represent the particle simulation data in a grid and also provide for efficient storage. For example, rather than visually representing each particle that is present in a cell, information representing each present particle may be processed such that a single quantity is associated with the cell. In one arrangement, data that represents each particle present in a cell's geometry is rasterized into a single value. As such, a single quantity is calculated for each active cell in a grid as such the grid 400. Through such an operation, a significant amount of information may in effect be compressed, and, the amount of data needed to represent the grid 400 may be drastically reduced. Accordingly, rasterizing of the cells reduces the amount of information needed to store and recreate the grid 400. For ease of illustration, a block 410 is defined as two-by-two cells (e.g., two cells along the x-axis and two cells along the y-axis). For each of these fours cells, particle simulation information contained in each cell is correspondingly rasterized to produce a value (for each cell). To represent the rasterized value, a single dot is illustrated in each cell of the block 410. Various methodologies may be used to represent each value, for example, each dot may be assigned a particular color to represent the rasterized data (e.g., particle information). As such, the four values may be stored (e.g., in the storage device 111) for later retrieval to recreate the block 410. For the other active blocks, cell and subcells of the grid 400, similar rasterized quantities may be stored for later retrieval (to recreate the grid 400).

Along with recreating a grid, the stored rasterized data may be retrieved for further processing such as for rendering two-dimensional images. For example, upon retrieval, the grid 400 may be efficiently recreated from the rasterized value representing each active cell. Once recreated, one or more two-dimensional images may be produced from the grid by using one or more rendering techniques. For example, ray-tracing may be used to produce a two-dimensional image from the rasterized data represented by the recreated grid. The resolution of the produced two-dimensional image can be defined by cells of the grid. For example, the cells (2048 cells along the x-axis and 1024 cells along the y-axis) of the grid may map to the pixels of the image (2048 pixels by 1024 pixels). As such, in addition to aiding efficient storage of the grid, the rasterized values assist in efficient imagery production.

Figure 5:
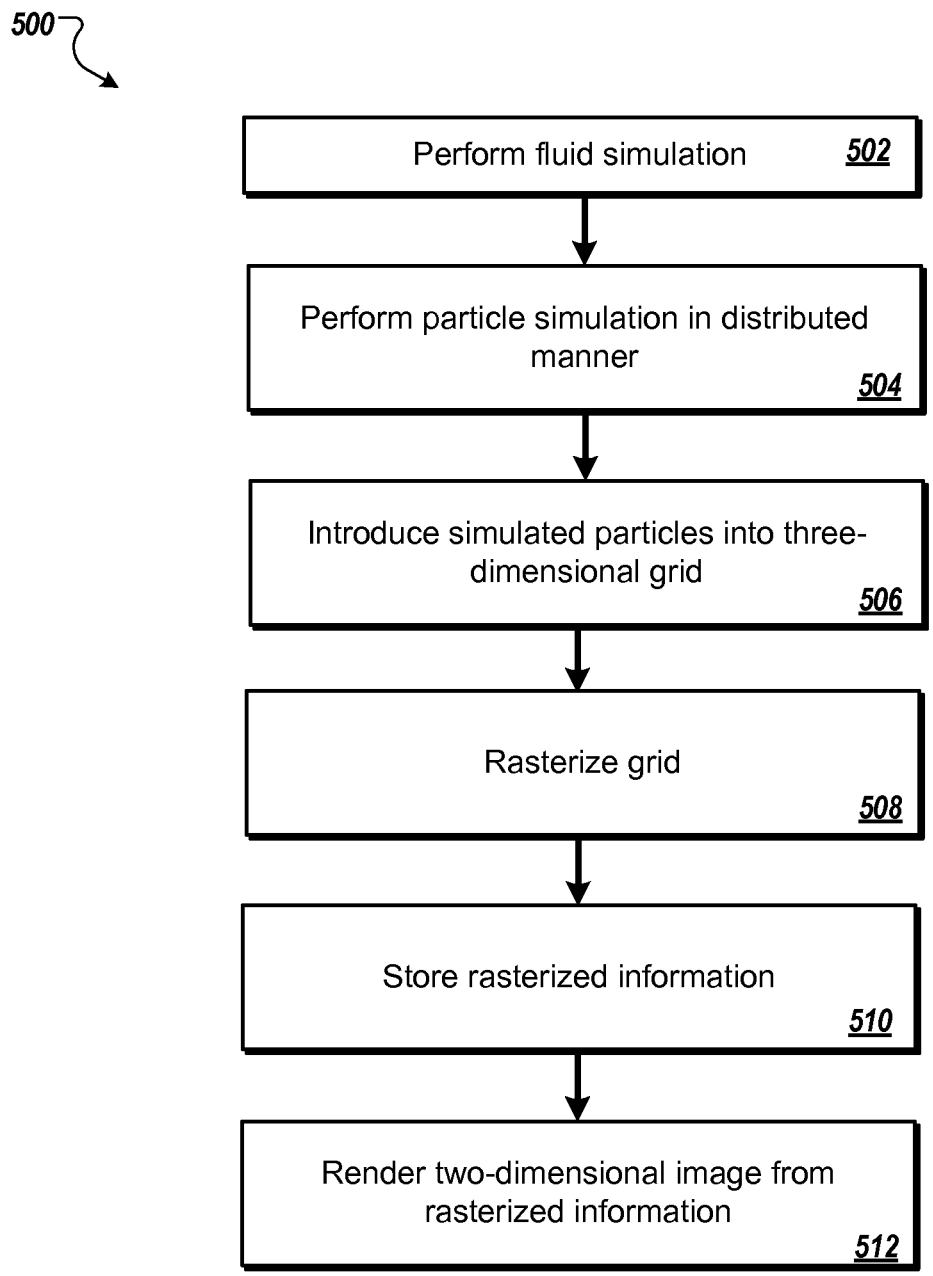
FIG. 5 is a flowchart of an example process for simulating and rendering particles.

Referring to FIG. 5, a flowchart 500 represents operations for simulating an arbitrary number of particles (e.g., in a vector field of a fluid simulation) for efficient storage and image production. Typically some of the operations are executed by multiple computing devices while other operations are executed by a single computing device. However, operations may be executed by implementing various distributed computing techniques at one or more locations.

Initially operations of a computing device may include performing 502 a first simulation such as a fluid simulation to produce one or more vector fields (which may or may not include scalar quantities). For example a fluid simulator (e.g., such as the fluid simulators 104, 106 shown in FIG. 1) may be used to produce a vector field that represents the three-dimensional simulation of a globally coupled fluid model. Operations may also include performing 504 a particle simulation in a distributed manner. For example, not considering globally coupled, locally located particles may be grouped for simulation on a single computing device and remotely located particle groups may be assigned to other computing devices. As such, the particle simulation is distributed among a number of computing devices, thereby increasing computation efficiency while conserving computational resources (of each individual computing device). Operations may include introducing 506 the simulated particles into a three-dimensional grid such as the three-dimensional frustum 400 (shown in FIG. 4). Such an operation can include appropriately populating cells of the grid with data that represents the simulated particles (e.g., particles can be represented in the grid based upon the relative location of the particles). Additionally, introducing the particles may also include determining if one or more of the cells are absent a particle (or a predefined number of particles). If determined to be lacking a particle (or particles), the corresponding cell of the grid may be deactivated (and not accessed for further simulation operations). Operations may also include rasterizing 508 each cell in the grid such that the particles in the grid are represented, for example, by a single quantity. As such, rasterized information representing the particles residing in the grid cells may be stored 510 and thereby considerably reduce the amount of space needed to store data that represents the grid and the particle information. The rasterized information may also be used for rending 512 two-dimensional images. For example, ray-tracing maybe used to efficiently process the rasterized information associated with each active grid cell into a two-dimensional image. The rasterized information may also be retrieved from storage and processed to produce such imagery.

Figure 6:
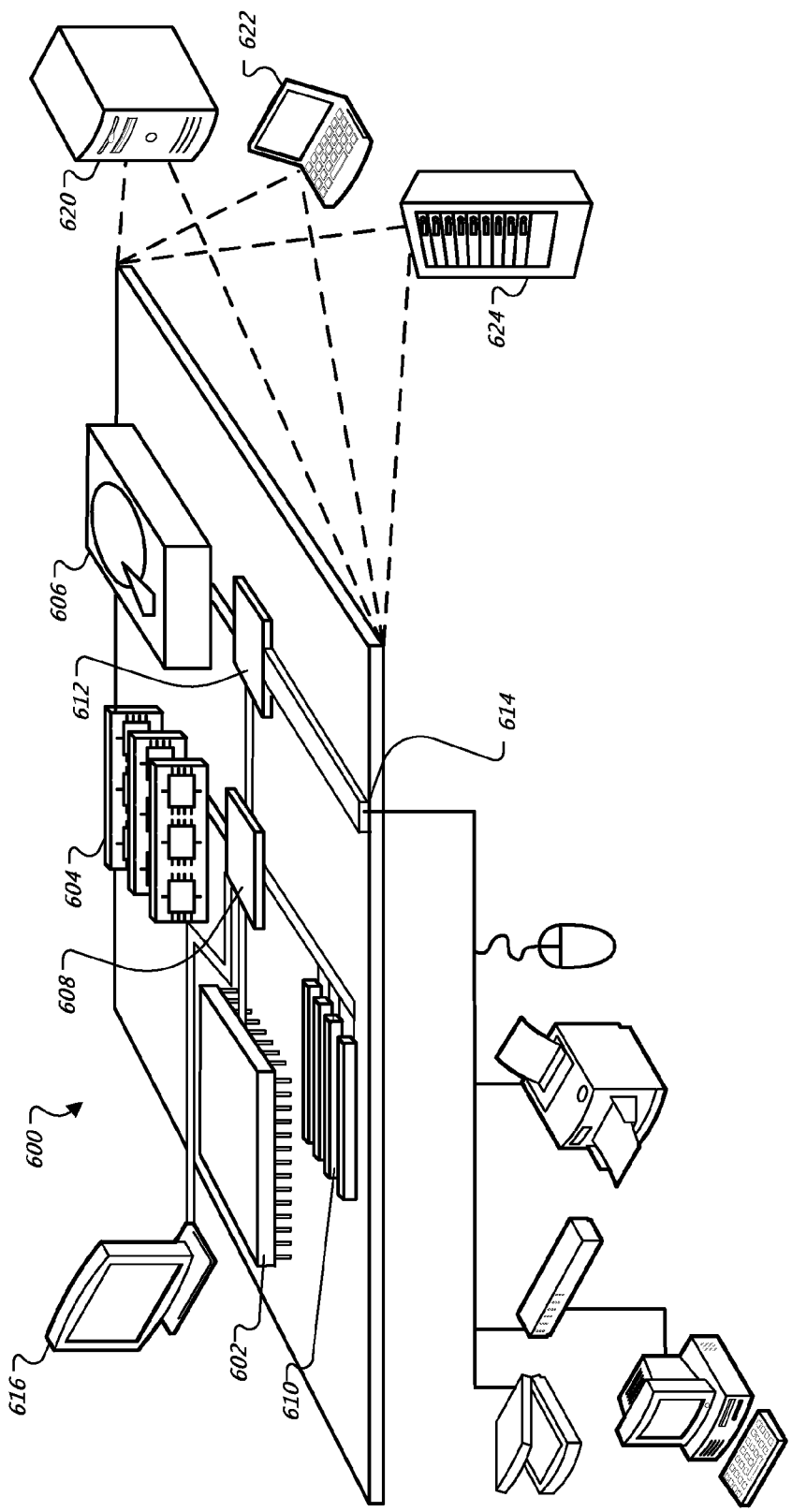
FIG. 6 is a block diagram of a computing system that can be used in connection with computer-implemented methods described in this document.

FIG. 6 is a block diagram of computing devices that may be used and implemented to perform operations associated with simulating an arbitrary number of particles. Computing device 600 can also represent various forms of digital computers, such as laptops, desktops, workstations, personal digital assistants, servers, blade servers, mainframes, and other appropriate computers.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and can be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses can be used, as appropriate, along with multiple memories and types of memory. Also, multiple computing devices 600 can be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 can be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, memory on processor 602, or the like.

The high speed controller 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which can accept various expansion cards (not shown). In the implementation, low-speed controller 612 is coupled to storage device 606 and low-speed expansion port 614. The low-speed expansion port, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 600 can be implemented in a number of different forms, as shown in the figure. For example, it can be implemented as a standard server 620, or multiple times in a group of such servers. It can also be implemented as part of a rack server system 624. In addition, it can be implemented in a personal computer such as a laptop computer 622. Alternatively, components from computing device 600 can be combined with other components in a mobile device (not shown).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
obtaining first data corresponding to a first simulation of fluid matter in a Cartesian space domain, the first data produced from a globally coupled fluid model;
defining a three-dimensional (3D) grid of cells to represent at least a part of the space domain, wherein the 3D grid of cells forms a frustum-shaped perspective grid;
identifying a first plurality of the cells of the 3D grid of cells that contain components of the fluid matter according to the first data;
subdividing the identified cells into a plurality of subcells;
performing, for each of the plurality of subcells, using the first data, a second simulation of the fluid matter that produces second data representative of physical properties of the fluid matter in the subcells, the second simulation being particle-based;
for each subcell, compressing particle simulation information from the second data to produce at least one value for each of a second plurality of cells of the 3D grid; and
storing the values for each of the second plurality of cells in a retrievable form.

2. The computer-implemented method of claim 1, further comprising rendering an image of the fluid from the stored values.

3. The computer-implemented method of claim 2, in which rendering the image includes ray tracing the cells of the 3D grid.

4. The computer-implemented method of claim 1, in which performing the second particle-based simulation is distributed among multiple computing devices that each comprise at least one processor.

5. The computer-implemented method of claim 1, in which the first data comprises a vector field.

6. The computer-implemented method of claim 1, in which the second plurality of cells is determined by which cells of the 3D grid comprise a minimum number of particles of the second simulation.

7. The computer-implemented method of claim 1 in which the cells of the grid have a common depth-to-size ratio.

8. The computer-implemented method of claim 1, wherein the 3D grid of cells forms a frustum-shaped 3D perspective grid from the perspective of a virtual camera.

9. The computer-implemented method of claim 8, wherein the at least one value produced for a cell nearer to the virtual camera provides greater detail of particle simulation information than the at least one value produced for a cell farther from the camera.

10. A system comprising:
a computing device comprising:
a memory configured to store instructions; and
a processor configured to execute the instructions to perform a method comprising:
obtaining first data corresponding to a first simulation of fluid matter in a Cartesian space domain, the first data produced from a globally coupled fluid model;
defining a three-dimensional (3D) grid of cells to represent at least a part of the space domain, wherein the 3D grid of cells forms a frustum-shaped perspective grid;
identifying a first plurality of the cells of the 3D grid of cells that contain components of the fluid matter according to the first data;
subdividing the identified cells into a plurality of subcells;
performing, for each of the plurality of subcells, using the first data, a second simulation of the fluid matter that produces second data representative of physical properties of the fluid matter in the subcells, the second simulation being particle-based;
for each subcell, compressing particle simulation information from the second data to produce at least one value for each of a second plurality of cells of the 3D grid; and
storing the values for each of the second plurality of cells in a retrievable form.

11. The system of claim 10, in which the processor is configured to render an image of the fluid from the stored values.

12. The system of claim 11, in which rendering the image includes ray tracing the cells of the 3D grid.

13. The system of claim 10, in which performing the second particle-based simulation is distributed among multiple computing devices that each comprise at least one processor.

14. The system of claim 10, in which the first data comprises a vector field.

15. The system claim 10, in which the second plurality of cells is determined by which cells of the 3D grid comprise a minimum number of particles of the second simulation.

16. The system of claim 10 in which the cells of the grid have a common depth-to-size ratio.

17. The system of claim 10, wherein the 3D grid of cells forms a frustrum-shaped 3D perspective grid from the perspective of a virtual camera.

18. The system of claim 10, wherein the at least one value produced for a cell nearer to the virtual camera provides greater detail of particle simulation information than the at least one value produced for a cell farther from the camera.

19. A computer program product tangibly embodied in a non-transitory information carrier and comprising instructions that when executed by a processor perform a method comprising:
obtaining first data corresponding to a first simulation of fluid matter in a Cartesian space domain, the first data produced from a globally coupled fluid model;
defining a three-dimensional (3D) grid of cells to represent at least a part of the space domain, wherein the 3D grid of cells forms a frustum-shaped perspective grid;
identifying a first plurality of the cells of the 3D grid of cells that contain components of the fluid matter according to the first data;
subdividing the identified cells into a plurality of subcells;
performing, for each of the plurality of subcells, using the first data, a second simulation of the fluid matter that produces second data representative of physical properties of the fluid matter in the subcells, the second simulation being particle-based;
for each subcell, compressing particle simulation information from the second data to produce at least one value for each of a second plurality of cells of the 3D grid; and
storing the values for each of the second plurality of cells in a retrievable form.

20. The computer program product of claim 19, further comprising instructions that when executed by the processor perform a method comprising rendering an image of the fluid from the stored values.

21. The computer program product of claim 20, in which rendering the image includes ray tracing the cells of the 3D grid.

22. The computer program product of claim 19, in which performing the second particle-based simulation is distributed among multiple computing devices that each comprise at least one processor.

23. The computer program product of claim 19, in which the first data comprises a vector field.

24. The computer program product of claim 19, in which the second plurality of cells is determined by which cells of the 3D grid comprise a minimum number of particles of the second simulation.

25. The computer program product of claim 19 in which the cells of the grid have a common depth-to-size ratio.

26. The computer program product of claim 19, wherein the 3D grid of cells forms a frustrum-shaped 3D perspective grid from the perspective of a virtual camera.

27. The computer program product of claim 19, wherein the at least one value produced for a cell nearer to the virtual camera provides greater detail of particle simulation information than the at least one value produced for a cell farther from the camera.

\* \* \* \* \*

UNITED STATES PATENT AND TRADEMARK OFFICE
CERTIFICATE OF CORRECTION

| | |
|---|---|
| PATENT NO. | : 8,970,592 B1 |
| APPLICATION NO. | : 13/089761 |
| DATED | : March 3, 2015 |
| INVENTOR(S) | : Frank Losasso Petterson |

Page 1 of 1

It is certified that error appears in the above-identified patent and that said Letters Patent is hereby corrected as shown below:

In the Claims

In claim 8, column 13, lines 47, delete "frustrum-shaped" and insert "frustum-shaped"

In claim 17, column 14, lines 29, delete "frustrum-shaped" and insert "frustum-shaped"

In claim 26, column 15, lines 24, delete "frustrum-shaped" and insert "frustum-shaped"

Signed and Sealed this
Twenty-third Day of June, 2015

Michelle K. Lee
*Director of the United States Patent and Trademark Office*